US012665362B2

(12) United States Patent
Parks

(10) Patent No.: US 12,665,362 B2
(45) Date of Patent: Jun. 23, 2026

(54) DEVICE CONFIGURATION BASED ON DETECTED USER

(71) Applicant: Sapient Industries, Inc., Philadelphia, PA (US)

(72) Inventor: Samuel M. Parks, Philadelphia, PA (US)

(73) Assignee: Sapient Industries, Inc., Philadelphia, PA (US)

( * ) Notice: Subject to any disclaimer, the term of this patent is extended or adjusted under 35 U.S.C. 154(b) by 239 days.

(21) Appl. No.: 18/459,837

(22) Filed: Sep. 1, 2023

(65) Prior Publication Data

US 2024/0063594 A1      Feb. 22, 2024

Related U.S. Application Data

(63) Continuation of application No. 17/443,292, filed on Jul. 23, 2021, now Pat. No. 11,777,266, which is a
(Continued)

(51) Int. Cl.

| | |
|---|---|
| *H01R 25/00* | (2006.01) |
| *G01K 7/00* | (2006.01) |
| *H01R 13/652* | (2006.01) |
| *H01R 13/66* | (2006.01) |
| *H01R 13/70* | (2006.01) |
| *H01R 103/00* | (2006.01) |
| *H02J 3/14* | (2026.01) |
| *H02J 13/13* | (2026.01) |
| *H02J 13/14* | (2026.01) |
| *H02J 13/38* | (2026.01) |

(Continued)

(52) U.S. Cl.
CPC ......... *H01R 25/006* (2013.01); *H01R 13/652* (2013.01); *H02J 3/14* (2013.01); *H02J 13/1311* (2026.01); *H02J 13/1331* (2026.01); *H02J 13/1333* (2026.01); *H02J 13/1335* (2026.01); *H02J 13/1337* (2026.01); *H02J 13/14* (2026.01); *H02J 13/38* (2026.01); *H04B 7/15507* (2013.01); *H04W 4/38* (2018.02); *G01K 7/00* (2013.01); *H01R 13/6658* (2013.01); *H01R 13/6675* (2013.01); *H01R 13/6683* (2013.01); *H01R 13/6691* (2013.01); *H01R 13/70* (2013.01); *H01R 2103/00* (2013.01); *H01R 2201/02* (2013.01); *H01R 2201/20* (2013.01); *H01R 2201/24* (2013.01); *H04W 4/80* (2018.02); *H04W 84/12* (2013.01)

(58) Field of Classification Search
CPC ...................................................... H04W 4/80
See application file for complete search history.

(56) References Cited

U.S. PATENT DOCUMENTS

| | | | |
|---|---|---|---|
| 1,733,222 | A | 10/1929 | Gehring |
| 2,860,317 | A | 11/1958 | Johnson |
| | | (Continued) | |

*Primary Examiner* — Wen W Huang
(74) *Attorney, Agent, or Firm* — Young Basile Hanlon & MacFarlane, P.C.

(57) ABSTRACT

Audio tones are detected by a device. An identifier of a user is extracted from the audio tones. The identifier of the user and status information associated with the device are transmitted to a remote server. The device is configured based on a rule received from the remote server, wherein the rule is based on times series data received from the device and indicative of usage of the device by the user.

20 Claims, 7 Drawing Sheets

HARDWARE BLOCK DIAGRAM

Related U.S. Application Data continuation of application No. 16/806,433, filed on Mar. 2, 2020, now Pat. No. 11,101,609, which is a continuation of application No. 16/042,944, filed on Jul. 23, 2018, now Pat. No. 10,622,770.

(60) Provisional application No. 62/626,994, filed on Feb. 6, 2018, provisional application No. 62/536,288, filed on Jul. 24, 2017.

(51) Int. Cl.

| | |
|---|---|
| *H04B 7/155* | (2006.01) |
| *H04W 4/38* | (2018.01) |
| *H04W 4/80* | (2018.01) |
| *H04W 84/12* | (2009.01) |

(56) References Cited

U.S. PATENT DOCUMENTS

| | | | |
|---|---|---|---|
| 3,437,738 A | 4/1969 | Wagner | |
| 4,839,716 A | 6/1989 | Butt | |
| 5,060,114 A | 10/1991 | Feinberg et al. | |
| 5,471,027 A | 11/1995 | Call et al. | |
| 5,486,725 A | 1/1996 | Keizer et al. | |
| 5,592,032 A | 1/1997 | Keizer et al. | |
| 5,734,206 A | 3/1998 | Keizer et al. | |
| 5,956,576 A | 9/1999 | Toy et al. | |
| 6,508,595 B1 | 1/2003 | Chan et al. | |
| 6,531,770 B2 | 3/2003 | Nakashima | |
| 7,318,732 B2 | 1/2008 | Kidman | |
| 7,964,989 B1 | 6/2011 | Puschnigg et al. | |
| 8,702,446 B2 | 4/2014 | Gonzalez | |
| 8,797,723 B2 | 8/2014 | Hilton et al. | |
| 8,941,017 B2 | 1/2015 | Nagano | |
| 9,007,186 B1 | 4/2015 | Krummey et al. | |
| 9,013,283 B1 | 4/2015 | Tackaberry | |
| 9,331,524 B1 | 5/2016 | Yetter | |
| 9,484,695 B2 | 11/2016 | Puschnigg et al. | |
| 9,705,330 B1 | 7/2017 | Yetter | |
| 9,760,140 B1 | 9/2017 | Krummey et al. | |
| 9,859,655 B2 | 1/2018 | Puschnigg et al. | |
| 10,042,342 B1 | 8/2018 | Tyrrell et al. | |
| 10,210,356 B2 | 2/2019 | Vechvittayakhlung | |
| 10,622,770 B2 | 4/2020 | Parks | |
| 11,101,609 B2 | 8/2021 | Parks | |
| 2002/0086567 A1 | 7/2002 | Cash | |
| 2003/0020289 A1 | 1/2003 | Dohrmann et al. | |
| 2003/0227220 A1 | 12/2003 | Biskup et al. | |
| 2005/0125083 A1 | 6/2005 | Kiko | |
| 2005/0200284 A1 | 9/2005 | Thompson et al. | |
| 2005/0235306 A1 | 10/2005 | Fima | |
| 2008/0218307 A1* | 9/2008 | Schoettle | H04L 12/282 |
| | | | 340/3.1 |
| 2008/0296047 A1 | 12/2008 | Kaji | |
| 2009/0234512 A1 | 9/2009 | Ewing et al. | |
| 2013/0227595 A1* | 8/2013 | Nielsen | H04N 21/4394 |
| | | | 725/11 |
| 2014/0203638 A1 | 7/2014 | Keswani et al. | |
| 2014/0335803 A1 | 11/2014 | Rivera | |
| 2015/0011208 A1 | 1/2015 | Terry | |
| 2015/0236449 A1 | 8/2015 | Puschnigg et al. | |
| 2015/0236453 A1 | 8/2015 | Magee, Jr. | |
| 2015/0236490 A1 | 8/2015 | Purves et al. | |
| 2015/0264529 A1* | 9/2015 | Cho | H04W 4/025 |
| | | | 455/456.6 |
| 2015/0280410 A1 | 10/2015 | Elberbaum | |
| 2015/0357762 A1 | 12/2015 | Green | |
| 2016/0029458 A1* | 1/2016 | Liu | H05B 47/11 |
| | | | 700/32 |
| 2016/0044447 A1 | 2/2016 | Tetreault et al. | |
| 2016/0186973 A1 | 6/2016 | Chien | |
| 2016/0372868 A1 | 12/2016 | Puschnigg et al. | |
| 2017/0256941 A1 | 9/2017 | Bowers et al. | |
| 2018/0007210 A1* | 1/2018 | Todasco | H04M 3/53366 |
| 2018/0136979 A1* | 5/2018 | Morris | G06F 9/5055 |
| 2018/0239435 A1* | 8/2018 | Ashoori | G06F 1/1694 |
| 2019/0027875 A1 | 1/2019 | Parks | |
| 2019/0027963 A1 | 1/2019 | Parks | |
| 2019/0035569 A1* | 1/2019 | Sadwick | H05B 45/20 |
| 2020/0203905 A1 | 6/2020 | Parks | |
| 2021/0104855 A1 | 4/2021 | Bayard et al. | |
| 2021/0265793 A1 | 8/2021 | Parks | |
| 2022/0021166 A1 | 1/2022 | Parks | |
| 2023/0170655 A1 | 6/2023 | Parks | |

* cited by examiner

402 ── Place a modular outlet device at an outlet receptacle

404 ── Wirelessly receive data from an electric device within the modular outlet device 406 ── Wirelessly transmit commands to the electric device within the modular outlet device

DEVICE CONFIGURATION BASED ON DETECTED USER

CROSS-REFERENCE TO RELATED APPLICATION(S)

This application is a continuation of U.S. patent application Ser. No. 17/443,292, filed Jul. 23, 2021, which is a continuation of U.S. patent application Ser. No. 16/806,433, filed Mar. 2, 2020, which is a continuation of U.S. patent application Ser. No. 16/042,944, filed Jul. 23, 2018, which claims the benefit of priority to U.S. Provisional Patent Application No. 62/626,994, filed Feb. 6, 2018, and U.S. Provisional Patent Application No. 62/536,288, filed Jul. 24, 2017, the entire contents of which are incorporated herein by reference.

TECHNICAL FIELD

This invention relates to custom power outlet sockets that have integrated wireless functionality.

BACKGROUND

The average household has an ever-increasing number of electric devices plugged in at any time. Many devices in a household are increasingly "smart" or have the ability to communicate with the internet, or with other devices. This paradigm is sometimes referred to as the "Internet of Things" (IoT). There is an increasing number of devices and capabilities that are available to a user and which a user may wish to employ without the expense of re-wiring a home.

SUMMARY

The disclosure is based, in part, on the implementation of a system for electric outlets that controls the outlet to perform functions that are customized to each outlet, such as automatically stopping power to the outlet, or collecting data at the outlet, such as ambient temperature data. Several outlets with differing or similar functions can be integrated into a single larger functionality, such as multiple outlets that collect temperature data in various locations and shares those data with a centralized thermostat unit. This electric outlet control can be done on a larger scale, such as a building.

In some embodiments, a modular outlet device comprises a housing that encloses a portion of an electronic device, and a wireless network interface in communication with the electronic device, the wireless network interface configured to receive signals from the electronic device, transmit data based on the received signals to a computing device, and receive commands from the computing device, and an inner wall housing configured to fit into an electrical outlet hole in a wall and interface with power lines inside the wall, wherein the housing is configured to removably attach to the inner wall housing, and when attached bring the power lines into electrical connection with the electronic device and the wireless network interface enclosed in the housing.

In some implementations, the electronic device comprises a wireless network signal booster. The wireless network interface conforms to the IEEE 802.11 wireless standard. The electronic device comprises a wireless network access point. The electronic device comprises a thermostat. The electronic device comprises a component of a home security system including one or more of a motion detector, a thermal camera, a light sensor, and a camera. The electronic device comprises an LCD or touch screen. The electronic device comprises a USB charger. The electronic device comprises a temperature sensor or thermostat control unit. The electronic device comprises a Bluetooth speaker or microphone. The electronic device comprises a light. The electronic device comprises an electric current sensor configured to measure current passing through the electronic device. The housing further encloses a relay switch that can open or close to stop or conduct current passing from the power lines to the electronic device in response to a command received by the wireless network interface. A button on the housing or the inner wall housing when pressed disconnects the housing from the inner wall housing. The wireless network interface is configured to transmit data to the electronic device.

In further embodiments, a system comprises a first modular outlet device comprising a housing that encloses a portion of a first electronic device and a first wireless network interface in communication with the first electronic device, the first wireless network interface configured to receive signals from the first electronic device, transmit data based on the received signals to a computing device, and receive commands from the computing device, and a first inner wall housing configured to fit into an electrical outlet hole in a wall and interface with power lines inside the wall, wherein the housing is configured to removably attach to the first inner wall housing, and when attached bring the power lines into electrical connection with the first electronic device and the first wireless network interface enclosed in the housing. A second modular outlet device comprises a housing that encloses a portion of a second electronic device and a second wireless network interface in communication with the second electronic device, the second wireless network interface configured to receive signals from the second electronic device, transmit data based on the received signals to a computing device, and receive commands from the computing device, and a second inner wall housing configured to fit into an electrical outlet hole in a wall and interface with power lines inside the wall, wherein the housing is configured to removably attach to the second inner wall housing, and when attached bring the power lines into electrical connection with the second electronic device and the second wireless network interface enclosed in the housing, and a computing device comprising a memory configured to store instructions, and a processor to execute the instructions to perform operations.

In some implementations, the first electronic device or the second electronic device is one of a motion detector, thermal camera, light sensor, or camera. The first electronic device and the second electronic device are each temperature sensors and operations comprise transmitting temperature data wirelessly to a thermostat control. The computing device receives the data from a processor in wireless communication with the power outlet. The computing device transmits instructions to the first and/or second modular outlet device via the processor which is in wireless communication with the first and second modular outlet devices. The operations comprise transmitting data collected by the computing device to a cloud storage. The operations comprise implementing a rule for controlling the first or second electronic device. Also included can be a smart phone interface that permits a user to control the first electronic device and the second electronic device. Also included can be three or more modular outlet devices, each comprising a housing that encloses a portion of an electronic device and a wireless network interface in communication with the electronic device, the wireless network interface configured to receive signals from the electronic device, transmit data based on the received signals to a computing device, and receive commands from the computing device, and an inner wall housing configured to fit into an electrical outlet hole in a wall and interface with power lines inside the wall, wherein the housing is configured to removably attach to the inner wall housing, and when attached bring the power lines into electrical connection with the electronic device and the wireless network interface enclosed in the housing.

Advantages of the methods and systems described include the ability to perform electricity usage control customized to each outlet in a locale, integration on a private wireless network, and enabling a user to control the outlets. Advantages also include the ability to perform on/off power control of an outlet as well as power usage sensing. These functions are performed for each socket of the outlet, rather than on circuit-wide scale. The outlet per outlet monitoring control allows the devices plugged into each outlet to be individually identified and controlled. Further advantages include the ability to implement various customizable systems easily, and easy installation, for example of thermostat, audio/visual or security systems. Use of such customizable modules are also less expensive compared to conventional systems.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

Like reference symbols in the various drawings indicate like elements.

DETAILED DESCRIPTION

The disclosure is based, in part, on the implementation of a system for electric outlets that provides custom hardware at an electric outlet and control of the custom hardware or module at the outlet to perform functions particular to the installed custom outlet module. The system uploads any data collected at the outlet to the "cloud" (e.g., remote servers) to be used in other ways. Functions can include automatically stopping power to the outlet, or sending commands to the hardware at the outlet. Several outlets with differing or similar functions can be integrated into a single larger functionality, such as multiple outlets that collect temperature data in various locations and share those data with a centralized thermostat unit. This custom hardware control can be done on a larger scale, such as for a building.

Figure 1A:
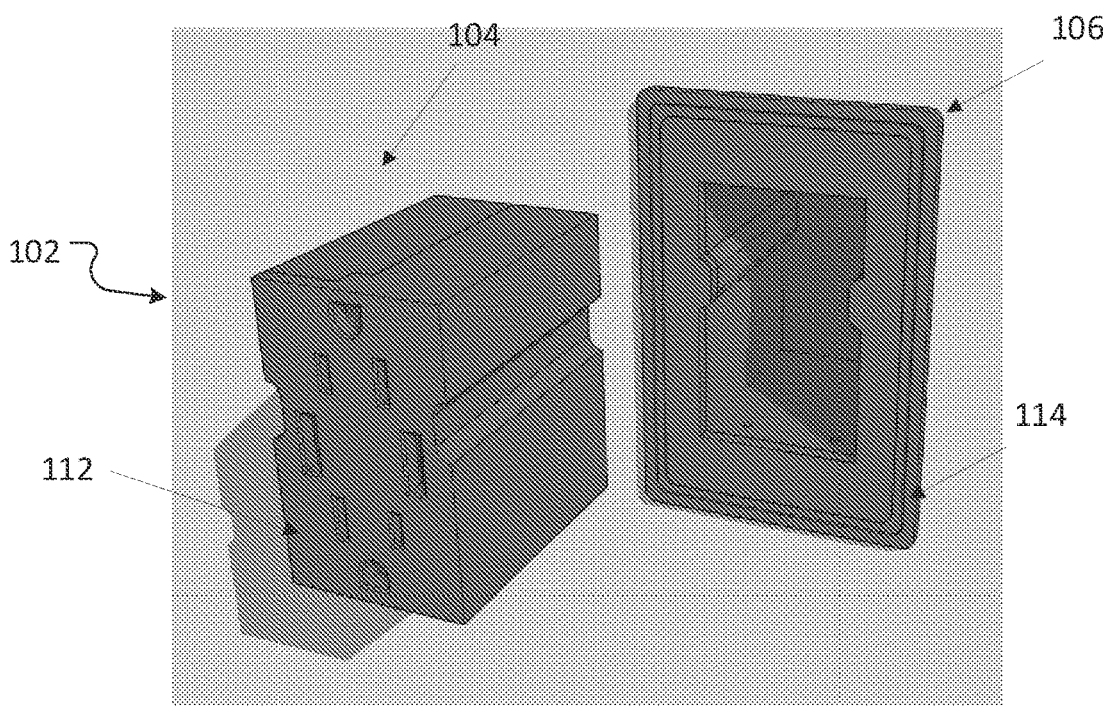
FIGS. 1A-B are hardware components for use with a custom power outlet socket with integrated wireless functionality.
Figure 1B:
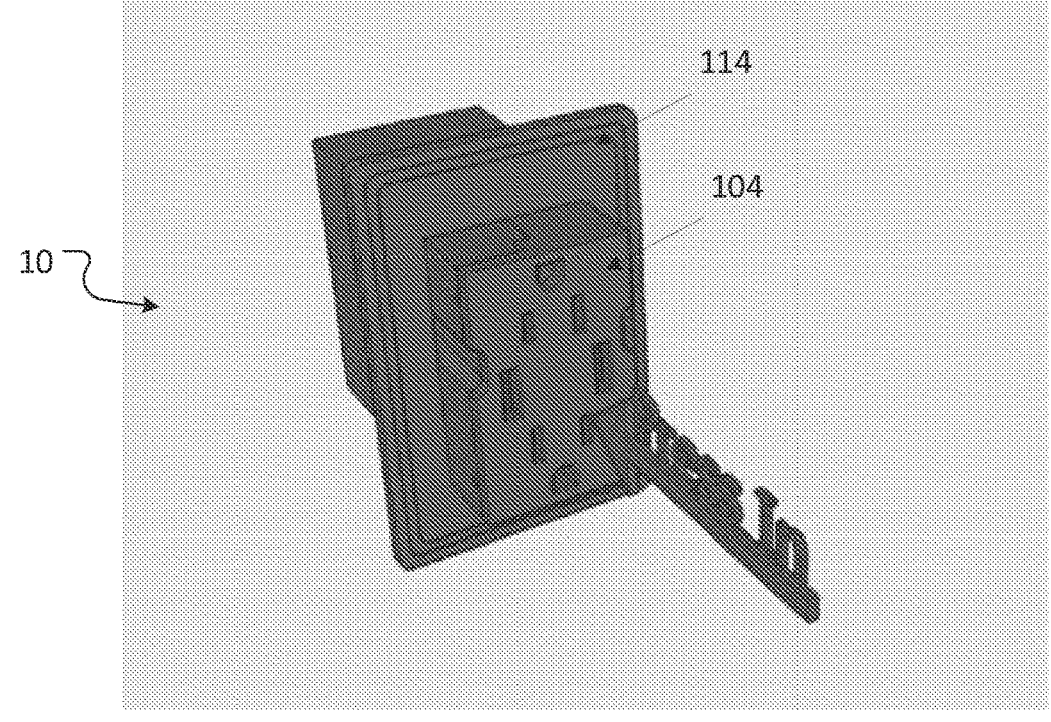

FIGS. 1A-B show example hardware components for a custom outlet module 102 that replaces a conventional wall outlet at an outlet location 106. The custom outlet module 102 has a housing 104 which is attached to a functional unit 112. In the example illustrated, the functional unit 112 has the form of sockets such as those on a conventional electric outlet, however the functional unit 112 can have many possible forms as discussed below. The housing 104 mates with an inner wall housing 114, being a wall-insert block that is placed in the outlet location 106, which is typically a hole in a wall cut for a conventional outlet. For ease of installation, the assembled housing 104 slides into the installed inner wall housing 114 (FIG. 1B), and can be removed by sliding it from the inner wall housing 114.

Figure 3:
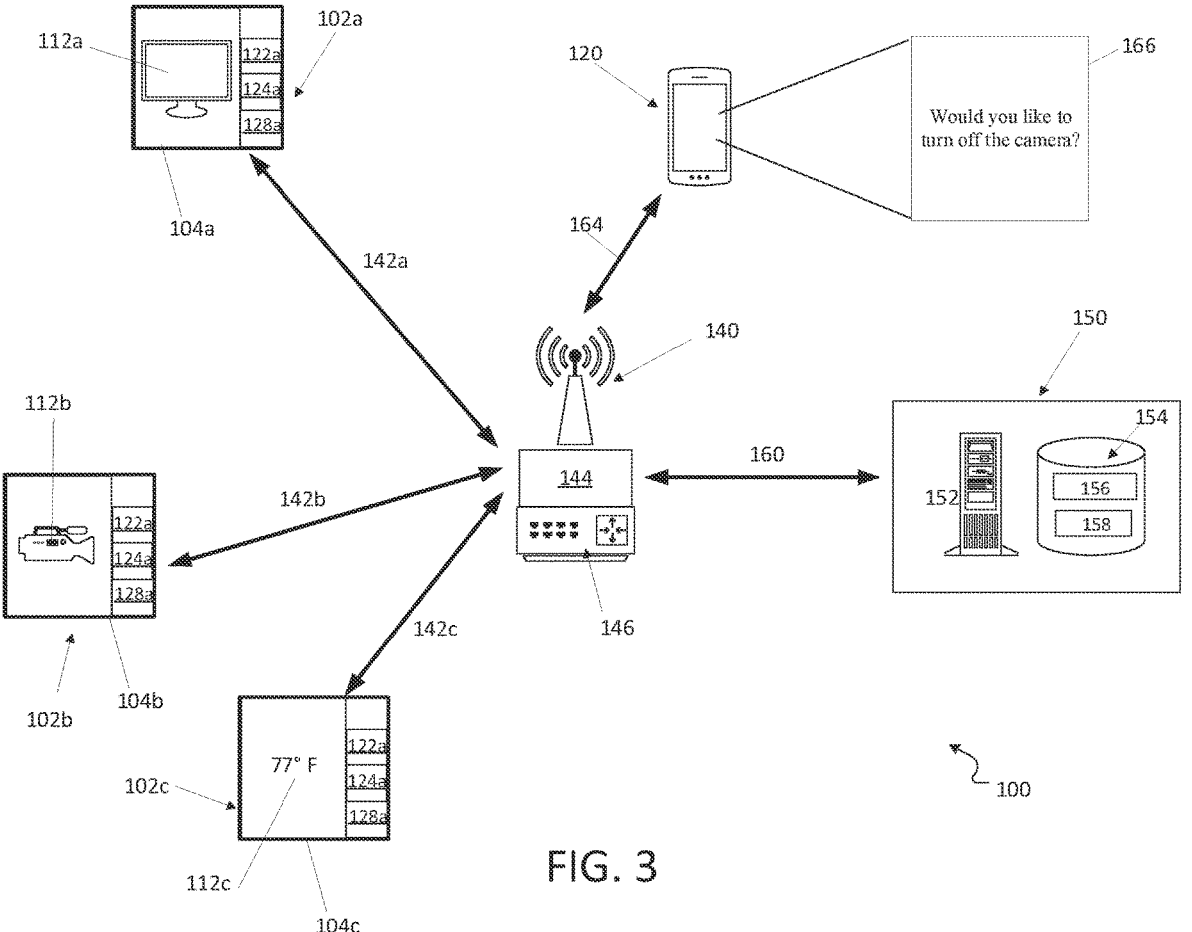
FIG. 3 is a schematic of data collection and control scheme generation for a system with custom power outlet socket with integrated wireless functionality.

The housing 104 can accommodate various sensors 122 therein, as well as a wireless network interface 128 (shown in FIG. 3). In some embodiments, the housing 104 has plugs on the back of the housing 104. Rather than sliding into the wide or mating with the inner wall housing 114, the device plugs into the socket of a traditional outlet. In other embodiments, the custom outlet module 102 can be installed in a wall and replace traditional outlets to give customized control and capability.

Figures 2A, 2B, 2C:
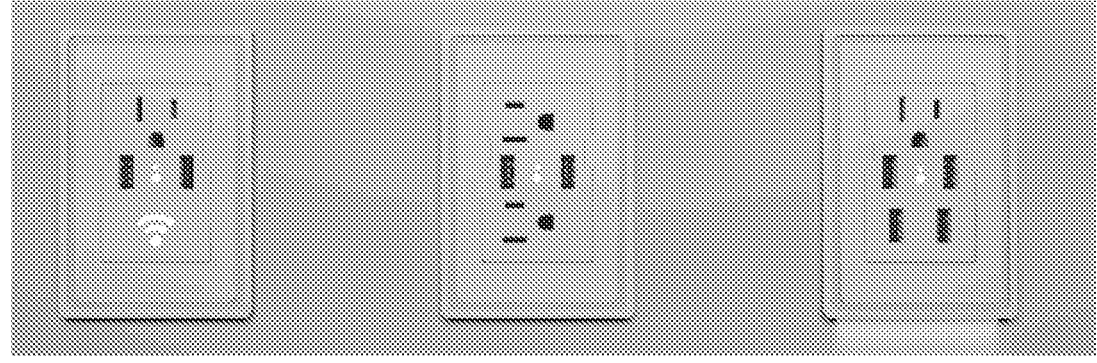
FIGS. 2A-C are examples of customized hardware components for use with a custom power outlet socket with integrated wireless functionality.

FIGS. 2A-C show specific implementations of a custom outlet module 102 with differing customized hardware. For example, the custom outlet module 102 can include a Wi-Fi (e.g., IEEE 802.11) signal booster as the functional unit 112 (FIG. 2A). The custom outlet module 102 can include a Wi-Fi hotspot as the functional unit 112. The custom outlet module 102 can include a thermostat as the functional unit 112. In the custom outlet module 102 the functional unit 112 can be elements of a home security system (e.g., a camera, a motion detector, a light in communication with a motion detector). In the custom outlet module 102 the functional unit 112 can be an LCD or touch screen. Such screens can include multiple applications, such as a screen that controls light brightness in a kitchen, or controls an entertainment system, or is itself a screen that displays audiovisual content. As another example, in the custom outlet module 102 the functional unit 112 can include USB plugs (FIGS. 2B and 2C).

An advantageous aspect of a custom outlet module 102 is its modularity. The inner wall housing 114, once in place, can interface with a housing 104 with any number of different functional units 112 attached thereto. A wide variety of such modules are thus easily installed, having differing functionalities due to the differing functional units 112 attached to the housing 104. A user does not have to rewire an outlet; instead once the inner wall housing 114 is in place the user can simply remove the housing 104 and attached functional unit 112, and replace it with a different module with the same characteristic housing 104 but a different functional unit 112. In some embodiments the housing 104 plugs into the socket of a conventional electric outlet rather than being sized and shaped to replace a standard electric outlet at an outlet location 106.

A variety of functional units 112 can be used to easily and quickly customize any particular outlet location 106 into a dedicated custom device. For example, an outlet that is inconveniently located (e.g., behind furniture) can be equipped with a custom outlet module 102 with a functional unit that is a stereo, allowing an otherwise neglected outlet location to provide surround sound. Such an outlet location 106 could instead be equipped with a microphone in communication with a voice-activated digital assistant. Another outlet location 106 that is only used to charge electric devices such as mobile phones could be replaced with USB chargers as the functional unit 112.

Other possibilities of customized use include, for example, modules that replace or integrate with a home security system. Rather than technicians having to wire through walls to install or extend a security system, a user can install custom outlet modules 102 that have thermal cameras, light sensors, cameras, and other elements that can be slid into place where such a security system element would be useful. In another example, a custom outlet module 102 can include a temperature sensor as a functional unit 112. The temperature sensor can integrate with an existing home climate system, providing temperature information at the location of the installed custom outlet module 102, improving thermostat accuracy by increasing the resolution of heat sensing throughout the home.

FIG. 3 shows a schematic for an example outlet control system 100. The outlet control system 100 includes at least one custom outlet module 102, depicted in FIG. 3 as three custom outlet modules 102a, 102b, 102c, each installed at a different electrical outlet location. Elements in FIG. 3 that are replicated for each of the custom outlet modules 102a, 102b, 102c are given the suffix a, b, c, and should be understood as being elements specific to that custom outlet module 102a, 102b, 102c, but otherwise similar to each other. FIG. 3 shows three custom outlet modules 102a, 102b, 102c as an example, but the outlet control system 100 can manage data and control more than three devices, for example more than 10 devices, more than 20 devices, up to 80 devices, etc. In the implementation shown, custom outlet module 102a has a screen as a functional unit 112a, custom outlet module 102b has a functional unit 112b that is a camera used for security, and in custom outlet module 102c the functional unit 112c is a thermometer or thermostat. The outlet control system 100 can communicate with multiple custom outlet modules 102 installed at multiple outlets in a space, such as an apartment, a house, or a building.

Each custom outlet module 102a, 102b, 102c can include one or more sensors 122a, 122b, 122c, such as an electric current sensor that measures the current passing through the custom outlet module 102a, 102b, 102c, as is known in the art. The sensors 122 can include a proximity sensor within the device housing 104. The proximity sensor detects the distance to, or the proximity of, an object relative to the proximity sensor (e.g., an RFID tag).

Each custom outlet module 102a, 102b, 102c can have a relay switch 124a, 124b, 124c connected to the wiring of the custom outlet module 102a, 102b, 102c. The relay switch 124a, 124b, 124c can open or close the circuit conducting electricity to the outlet location, to conduct or to stop the current flowing through the circuit. Turning off power can eliminate vampire current, reducing unwanted power usage when consumer devices are not in use. In some instances, the information collected by the sensors 122a, 122b, 122c is analyzed by the outlet control system 100 to create a personal profile for controlling each custom outlet module 102a, 102b, 102c, optimizing how electricity is used at the respective outlets, reducing both costs and environmental impact.

Each custom outlet module 102a, 102b, 102c includes a wireless network interface 128a, 128b, 128c in communication with the sensors 122. The wireless network interface 128a, 128b, 128c collects the data from the sensors 122a, 122b, 122c. The wireless network interface 128a, 128b, 128c packages the data received from the sensors 122a, 122b, 122c and the interface 128a, 128b, 128c then transmits the data via a wireless network 140 to an access hub 144.

The network interface 128 can be, for example, a Wi-Fi chip. One example of a Wi-Fi chip is from Texas Instruments Inc.® (Texas Instruments "Simple Link CC3220SF12ARGKT"). Such a chip has capacity for additional built-in functions, so that a single chip can replace both a dedicated Wi-Fi chip that interfaces with the Internet and a dedicated processor for handling the information transmitted. Thus, the network interface 128 uses the single chip, which includes a web server, and adds additional functionality. This implementation is less expensive than many alternatives and can handle necessary functions so that each outlet has its own dedicated chip independently connected to the internet.

The access hub 144 is a private internet access computing device that interfaces with a wireless router 146. The access hub 144 connects to a conventional wireless router 146, e.g., by plugging into the router 146. The access hub 144 uses the wireless router 146 to transmit received outlet data 142 to a power service manager 150. The power service manager 150 can be in the cloud.

The power service manager 150 includes a processor 152, and a storage system such as a database 154. The database 154 saves all the outlet data transmitted to the power service manager by the access hub 144 at various time intervals. The processor 152 of the power service manager 150 interfaces with the database 154. In some instances, the processor 152 includes a program that uses the outlet data 142 stored as usage history 156 stored in the database 154 to develop power control profiles 158 for controlling the power of the custom outlet module 102.

Power control profiles 158 can be stored on the database 154, and are associated with the differing functional units 112. For example, a particular power control profile 158 can be used when the functional unit 112 is a light instead of another device such as a camera. The power service manager 150 transmits on/off or other control signals (e.g., increase brightness of a light) to the access hub 144 via the router 146. The access hub 144 transmits the control signals 160 via the wireless network 140 to the wireless network interface 128. The wireless network interface 128 in turn transmits control signals to the functional unit 112 (e.g., sends a command to turn on or off the device to the relay switch 124).

The access hub 144 plugs into the back of a router 146, creating a private access point to any of the smart outlets. Since each access hub 144 plugs directly into the router 146, it is relatively easy to implement security. Initial set up of the outlet control system 100 is easy as well: with custom outlet modules 102a, 102b, 102c installed, a user need only plug the access hub 144 into her router 146. The access hub 144 will automatically connect to the power service manager 150, receive instructions, and install all the custom outlet modules 102a, 102b, 102c.

The technique implemented by the outlet control system 100 can include receiving outlet data 142a, 142b, 142c representing the power use of multiple power outlets with installed custom outlet modules 102a, 102b, 102c over a period of time. Each of the custom outlet modules 102a, 102b, 102c also receives data at its respective sensors 122.

The wireless router 146 relays any collected data from the access hub 144 to the power service manager 150. The power service manager 150 chooses the correct control profile 158 for each custom outlet module 102a, 102b, 102c, and sends commands 160 received at the access hub 144 and transmitted to the respective power outlet.

Device profiles stored in the database 154 allow the power service manager 150 to identify the type of consumer devices customized as custom outlet modules 102a, 102b, 102c. The power service manager 150 has rules for the specific device that it can implement or suggest to the user before implementing, or the user can specify rules immediately upon plugging a device in.

Power control profiles 158a, 158b, 158c include rules for powering or disconnecting various custom outlet modules 102a, 102b, 102c based on their type and their usage. A profile 158c for the screen plugged into a custom outlet module 102a that is located in the kitchen for example, would be implemented by the power control manager 150 sending an on/off command 160c to the custom outlet module 102c to turn off the power to the circuit for most of the day. In the morning, an on/off command would turn the custom outlet module 102c back on. The profile may include sending an off command 160c when a certain criteria is met, such as it is past 9 a.m. and the user has typically left the house.

Another example profile 158 could be for a security camera custom outlet module 102b. Security cameras are always on and a profile 158 that identified the functional unit 112b of custom outlet module 102b could therefore include an always-on command in the on/off signal 160a.

Notification messages 166 are sent to the user 118 to confirm such schedules and profiles 158 as they are developed by the power service manager 150. For example, the notification message 166 can ask for confirmation of the power on or power off schedule proposed for a specific custom outlet module 102a, 102b, 102c. The app can include overrides, so that a user can, for example, watch the screen plugged into the kitchen in the afternoon.

Notification messages 166 that a user could receive include a "New Device" notification. This type of notification is sent immediately upon plugging in a new consumer device that is detected by the system 100 and the user will have the option to specify the kind of consumer device if desired, or the type of consumer device will be automatically detected.

Figure 4A:
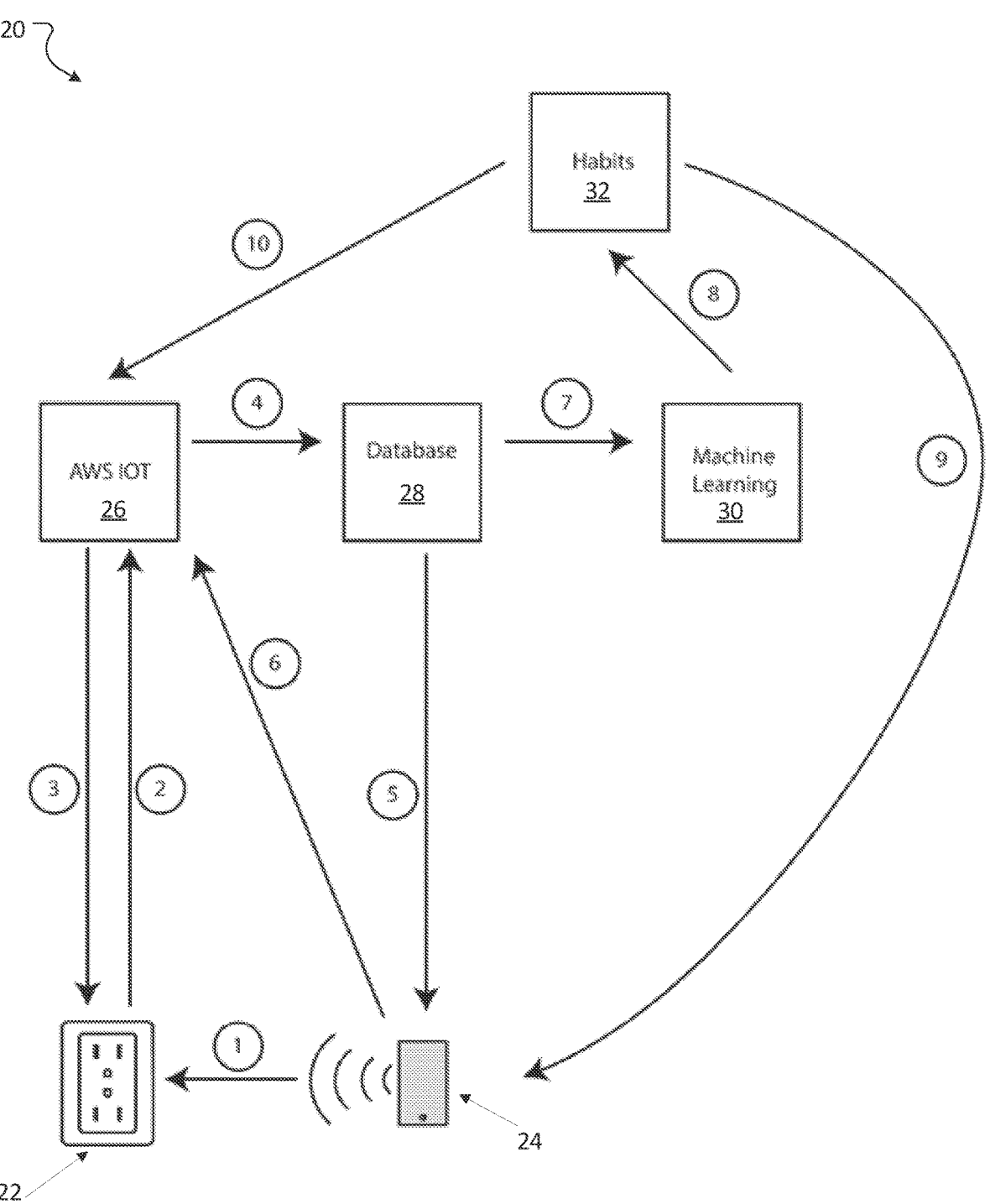
FIG. 4A is a schematic of a second data collection and control scheme generation for a system with custom power outlet socket with integrated wireless functionality.

FIG. 4A shows an exemplary configuration that does not use an intermediary access hub 144 between each outlet and the cloud. Instead, in system 20, each custom outlet 22 is directly connected to the cloud and proximity is sensed via a Bluetooth low energy (BLE) beacon in each outlet that is detected via cell phone 24. In an example implementation, audio tones 1 are produced by the phone 24 intermittently. These tones contain an ID associated with a user. These IDs are extracted by each outlet 22 that detects the tone and packaged into information uploaded to a backend system 26, e.g., an Amazon Web Services Internet of Things (AWS IoT). Upon receiving one or more of these IDs, the user is said to be sensed "in proximity" to the custom outlet 22. Signals 2 representing the power, temperature, the state of each relay (e.g., the status of switches/relays that control power going to the sockets of the outlet), and the IDs of the individuals in proximity to the outlet (if there are any) are uploaded at an interval less than once every 5 minutes but greater than once every 30 seconds.

The backend system 26 mediates the control of states of the outlets 22 (e.g., the state of each relay in the outlet) using device "shadows" 3. A "shadow" is a representation of current state information. In this instance, a "device shadow" is a JavaScript Object Notation (JSON) document that is used to store and retrieve current state information for a device, the outlets 22. A device shadow is maintained for each outlet 22 connected to the backend system 26, and provides the status of each outlet 22.

The signals 2 uploaded to the backend system 26 are sent as data 4 and packaged into a time series database 28 for access by a mobile app, web app, and machine learning component 30 (e.g., a python machine learning component receiving data 7) of the backend system 26. These data 5 are also used to populate graphs and provide analytical insight into a user's (e.g., a person or an entire institution) system and electrical usage. Direct control over outlets 22 (or in other words, direct control over device shadows) is given to the mobile (and web-based) application. The database 28 provides the data needed for each generation of machine learning analysis by the machine learning component 30. The web app is a control dashboard offering detailed insight into a system 20, for example, breakdowns of the kinds of devices that are on, costing the most in power, etc.

All forms of the data (user proximity, time-series power data, etc.) and data 8 generated by the machine learning component 30 are used to construct habits 32. Habits 32 are rules that become the "controllers" of device shadows and decide when devices should be powered. Typically, there is only one habit 32 per device (e.g., for each socket of each outlet 22). Habits 32 are learned and developed and improved for each device in the system. Once a habit 32 has been generated, a notification 9 is pushed to the user's phone 24 (or notification 10 viewable in the web app) asking the user permission to implement the habit 32 (and providing details to how the habit will work). If the habit 32 is authorized, the habit 32 has control over updating that device's associated outlet state shadow. The web app can show information such as which habits are active, which ones have been learned but not accepted, etc. A method of generating and using habits are discussed in detail in Application No. 62/536,288, filed on Jul. 24, 2017.

Figure 4B:
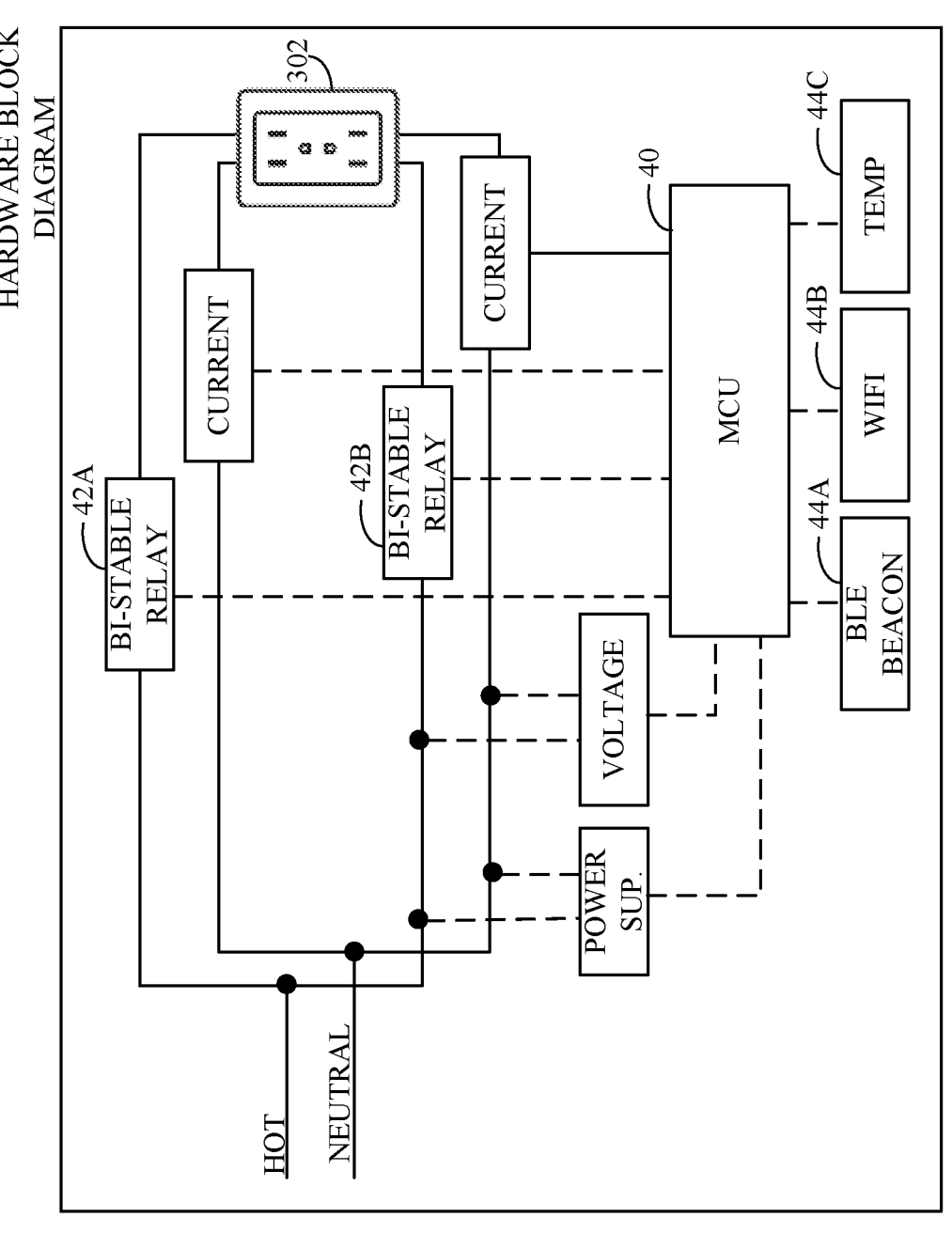
FIG. 4B is a schematic of the hardware for FIG. 4A.

FIG. 4B shows a hardware block diagram including a custom outlet module apparatus 350 (such as described above) that provide base functionality to a custom module 302. Relays 42A and 42B can be open or closed to prevent or allow current to flow to each of the sockets available in the shown custom outlet module 302. A microcontroller unit 40 (MCU) controls the relays 42A, 42B and also communicates with other components such as a BLE beacon 44A, Wi-Fi chip 44B, temperature sensor 44C or other components such as Wi-Fi repeaters, LCD screens, Bluetooth speakers, infrared cameras, etc.

Figure 5:
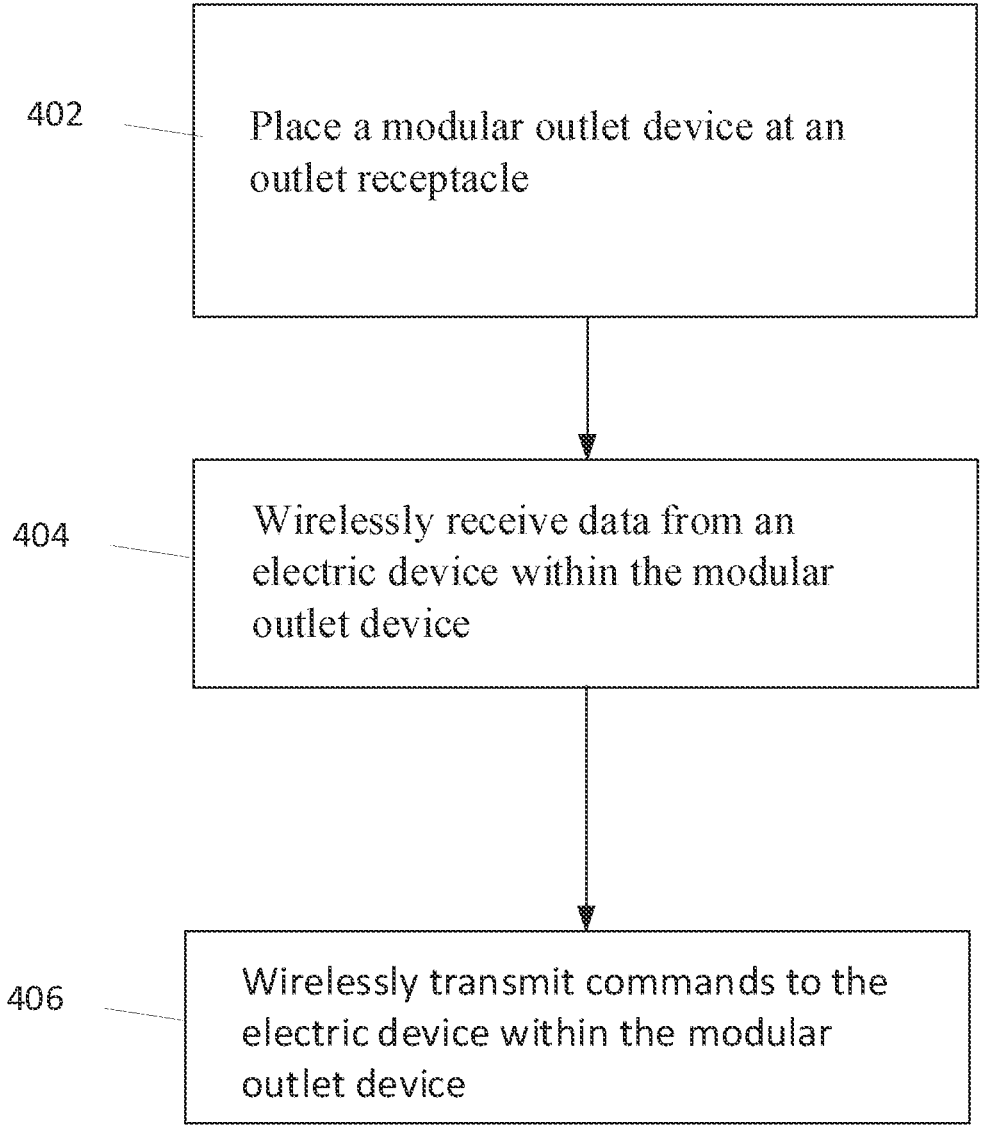
FIG. 5 is a flowchart for generating power control scheme using the system of FIG. 3.

FIG. 5 shows a flow chart for the outlet control system 100 to control one or more custom outlet modules 102. At step 402, a user places a modular outlet device at an outlet receptacle (e.g., outlet location 106). At step 404, the outlet control system 100, specifically the power service manager 150, receives outlet data 142 from the modular outlet device, including the type of functional unit 112 installed, and any information detected by sensors 122. At step 406, the power service manager 150 transmits control commands 160 to the modular outlet based on a control profile 158 the power service manager associates with the type of functional unit 112.

The outlet control system 100 can be used for implementations other than for household use. For example, the outlet control system 100 can be implemented for larger scale uses, such as a floor of an office building, an entire building such as an office, school, or dormitory, or an entire city block. Another non-consumer application of the power control system is in manufacturing and production. Additionally, other features of the system may be absent, such as generation and implementation of profiles 158. The outlet control system 100 could solely transmit signals from a user to an individual module.

Figure 6:
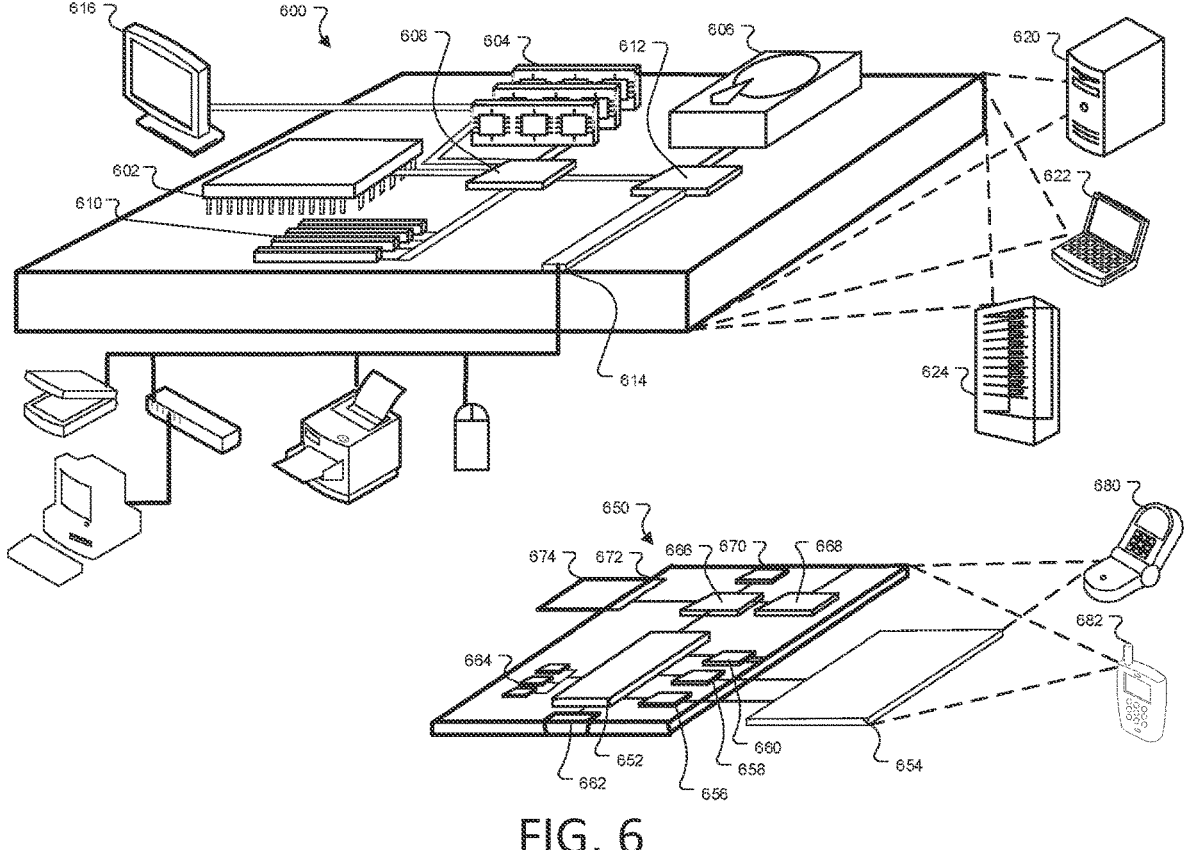
FIG. 6 illustrates an example of a computing device and a mobile computing device that can be used to implement the techniques described here.

FIG. 6 shows an example computer device 600 and example mobile computer device 650, which can be used to implement the techniques described herein. For example, a portion or all of the operations of the power service manager 150 may be executed by implementations of computer device 600 and/or the mobile computer device 650. Computing device 600 is intended to represent various forms of digital computers, including, e.g., laptops, desktops, workstations, personal digital assistants, servers, blade servers, mainframes, and other appropriate computers. Computing device 650 is intended to represent various forms of mobile devices, including, e.g., personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes processor 602, memory 604, storage device 606, high-speed interface 608 connecting to memory 604 and high-speed expansion ports 610, and low-speed interface 612 connecting to low-speed bus 614 and storage device 606. Each of components 602, 604, 606, 608, 610, and 612, are interconnected using various buses, and can be mounted on a common motherboard or in other manners as appropriate. Processor 602 can process instructions for execution within computing device 600, including instructions stored in memory 604 or on storage device 606, to display graphical data for a GUI on an external input/output device, including, e.g., display 616 coupled to high-speed interface 608. In other implementations, multiple processors and/or multiple buses can be used, as appropriate, along with multiple memories and types of memory. Also, multiple computing devices 600 can be connected, with each device providing portions of the necessary operations (e.g., as a server bank, a group of blade servers, or a multiprocessor system).

Memory 604 stores data within computing device 600. In one implementation, memory 604 is a volatile memory unit or units. In another implementation, memory 604 is a non-volatile memory unit or units. Memory 604 also can be another form of computer-readable medium, including, e.g., a magnetic or optical disk.

Storage device 606 is capable of providing mass storage for computing device 600. In one implementation, storage device 606 can be or contain a computer-readable medium, including, e.g., a floppy disk device, a hard disk device, an optical disk device, a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above. The data carrier is a computer- or machine-readable medium, including, e.g., memory 604, storage device 606, memory on processor 602, and the like.

High-speed controller 608 manages bandwidth-intensive operations for computing device 600, while low-speed controller 612 manages lower bandwidth-intensive operations. Such allocation of functions is an example only. In one implementation, high-speed controller 608 is coupled to memory 604, display 616 (e.g., through a graphics processor or accelerator), and to high-speed expansion ports 610, which can accept various expansion cards (not shown). In the implementation, the low-speed controller 612 is coupled to storage device 606 and low-speed expansion port 614. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router (e.g., through a network adapter).

Computing device 600 can be implemented in a number of different forms, as shown in the figure. For example, it can be implemented as standard server 620, or multiple times in a group of such servers. It also can be implemented as part of rack server system 624. In addition or as an alternative, it can be implemented in a personal computer (e.g., laptop computer 622). In some examples, components from computing device 600 can be combined with other components in a mobile device (not shown) (e.g., device 650). Each of such devices can contain one or more of computing device 600, 650, and an entire system can be made up of multiple computing devices 600, 650 communicating with each other.

Computing device 650 includes processor 652, memory 664, and an input/output device including, e.g., display 654, communication interface 666, and transceiver 668, among other components. Device 650 also can be provided with a storage device, including, e.g., a microdrive or other device, to provide additional storage. Components 650, 652, 664, 654, 666, and 668, may each be interconnected using various buses, and several of the components can be mounted on a common motherboard or in other manners as appropriate.

Processor 652 can execute instructions within computing device 650, including instructions stored in memory 664. The processor can be implemented as a chipset of chips that include separate and multiple analog and digital processors. The processor can provide, for example, for the coordination of the other components of device 650, including, e.g., control of user interfaces, applications run by device 650, and wireless communication by device 650.

Processor 652 can communicate with a user through control interface 658 and display interface 656 coupled to display 654. Display 654 can be, for example, a TFT LCD (Thin-Film-Transistor Liquid Crystal Display) or an OLED (Organic Light Emitting Diode) display, or other appropriate display technology. Display interface 656 can comprise appropriate circuitry for driving display 654 to present graphical and other data to a user. Control interface 658 can receive commands from a user and convert them for submission to processor 652. In addition, external interface 662 can communicate with processor 652, so as to enable near area communication of device 650 with other devices. External interface 662 can provide, for example, for wired communication in some implementations, or for wireless communication in other implementations. Multiple interfaces also can be used.

Memory 664 stores data within computing device 650. Memory 664 can be implemented as one or more of a computer-readable medium or media, a volatile memory unit or units, or a non-volatile memory unit or units. Expansion memory 674 also can be provided and connected to device 650 through expansion interface 672, which can include, for example, a SIMM (Single In Line Memory Module) card interface. Such expansion memory 674 can provide extra storage space for device 650, and/or may store applications or other data for device 650. Specifically, expansion memory 674 can also include instructions to carry out or supplement the processes described above and can include secure data. Thus, for example, expansion memory 674 can be provided as a security module for device 650 and can be programmed with instructions that permit secure use of device 650. In addition, secure applications can be provided through the SIMM cards, along with additional data, including, e.g., placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, including, e.g., those described above. The data carrier is a computer- or machine-readable medium, including, e.g., memory 664, expansion memory 674, and/or memory on processor 652, which can be received, for example, over transceiver 668 or external interface 662.

Device 650 can communicate wirelessly through communication interface 666, which can include digital signal processing circuitry where necessary. Communication interface 666 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 668. In addition, short-range communication can occur, including, e.g., using a Bluetooth®, Wi-Fi, or other such transceiver (not shown). In addition, GPS (Global Positioning System) receiver module 670 can provide additional navigation- and location-related wireless data to device 650, which can be used as appropriate by applications running on device 650.

Device 650 also can communicate audibly using audio codec 660, which can receive spoken data from a user and convert it to usable digital data. Audio codec 660 can likewise generate audible sound for a user, including, e.g., through a speaker, e.g., in a handset of device 650. Such sound can include sound from voice telephone calls, recorded sound (e.g., voice messages, music files, and the like) and also sound generated by applications operating on device 650.

Computing device 650 can be implemented in a number of different forms, as shown in the figure. For example, it can be implemented as cellular telephone 680. It also can be implemented as part of smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system. This includes at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for presenting data to the user, and a keyboard and a pointing device (e.g., a mouse or a trackball) by which the user can provide input to the computer. Other kinds of devices can be used to provide for interaction with a user as well. For example, feedback provided to the user can be a form of sensory feedback (e.g., visual feedback, auditory feedback, or tactile feedback). Input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such backend, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments of the invention have been described. Nevertheless, it will be understood that various modifications may be made without departing from the spirit and scope of the invention. Accordingly, other embodiments are within the scope of the following claims.

What is claimed is:

1. A method, comprising:
    detecting, by a device, audio tones, wherein the device is a modular outlet device comprising an inner wall housing that interfaces with power lines inside a wall and a housing that mates with the inner wall housing, the housing attached to an electronic device;
    extracting an identifier of a user from the audio tones;
    transmitting, to a remote server, the identifier of the user and status information associated with the device;
    identifying, by the remote server, a type of the electronic device; and
    configuring the device based on a rule received from the remote server, wherein the configuration is based on the type of the electronic device and time series data received from the device comprising usage information of the device by the user.

2. The method of claim 1, wherein the audio tones are received from a user device, the method further comprising:

sensing a proximity of the user device to the device based on beacons transmitted by the device.

3. The method of claim 1, wherein the status information associated with the device includes one or more of a power status, temperature information, or statuses of switches and relays.

4. The method of claim 1, wherein configuring the device based on the rule received from the remote server comprises: controlling power settings on the device.

5. The method of claim 1, wherein configuring the device based on the rule received from the remote server comprises: implementing user profiles on the device.

6. The method of claim 1, wherein configuring the device based on the rule received from the remote server comprises: transmitting, by the remote server, a notification of the rule to a user device; and receiving, at the device, the rule from the user device.

7. The method of claim 1, wherein the remote server includes a device shadow object that is a representation of the device and used to store and retrieve current state information for the device.

8. A system, comprising:
a device, wherein the device is a modular outlet device comprising an inner wall housing that interfaces with power lines inside a wall and mates with a housing attached to an electronic device, the device configured to:
detect audio tones transmitted by a user device;
extract an identifier of a user from the audio tones; and
transmit a package of information to a remote server, wherein the package of information includes the identifier and a type of the electronic device; and
the remote server, the remote server configured to:
receive the package of information from the device;
maintain, based on the package of information, a shadow device that is a representation of the device; and
transmit a rule for the device based on the type of the electronic device and time series data associated with the shadow device.

9. The system of claim 8, wherein the package of information includes data that are based on the electronic device of the device.

10. The system of claim 9, wherein the electronic device is a thermostat and the package of information includes temperature information.

11. The system of claim 9, wherein the device includes an electric sensor and the package of information includes a measurement of current passing through the device.

12. The system of claim 9, wherein the package of information includes a status of a relay switch of the device.

13. The system of claim 9, wherein the electronic device comprises a camera.

14. The system of claim 9, wherein the rule is based on the electronic device of the device.

15. The system of claim 8, wherein the rule is transmitted to the user device.

16. A modular outlet device, comprising:
a processor;
an inner wall housing that interfaces with power lines inside a wall and mates with a housing;
an electronic device attached to the housing;
a wireless network interface; and
a switch configured to control the electronic device based on a command received by the wireless network interface, wherein the processor is configured to:
detect audio tones;
extract an identifier of a user from the audio tones;
transmit via wireless network interface and to a remote server the identifier of the user and status information associated with the modular outlet device;
transmit an identifier associated with the electronic device; and
configure the modular outlet device based on a rule received from the remote server.

17. The modular outlet device of claim 16, wherein the electronic device is a temperature sensor and the status information associated with the modular outlet device comprises temperature information from the temperature sensor.

18. The modular outlet device of claim 16, wherein the electronic device is a camera.

19. The modular outlet device of claim 16, wherein the electronic device is a Bluetooth speaker or a microphone.

20. The modular outlet device of claim 16, wherein the electronic device comprises an electric current sensor configured to measure current passing through the electronic device.

* * * * *